(12) United States Patent
Kawaguchi et al.

(10) Patent No.: US 12,313,490 B2
(45) Date of Patent: May 27, 2025

(54) BENDING-IMPARTING DEVICE FOR MEASURING BENDING LOSS, AND BENDING TEST DEVICE

(71) Applicant: SUMITOMO ELECTRIC INDUSTRIES, LTD., Osaka (JP)

(72) Inventors: Yuki Kawaguchi, Osakashi (JP); Chonde Tei, Utsunomiya (JP); Tomoko Terauchi, Utsunomiya (JP); Tomoaki Hatanaka, Utsunomiya (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 153 days.

(21) Appl. No.: 18/001,406

(22) PCT Filed: Jun. 10, 2021

(86) PCT No.: PCT/JP2021/022195
§ 371 (c)(1),
(2) Date: Dec. 9, 2022

(87) PCT Pub. No.: WO2021/251473
PCT Pub. Date: Dec. 16, 2021

(65) Prior Publication Data
US 2023/0236087 A1    Jul. 27, 2023

(30) Foreign Application Priority Data
Jun. 12, 2020   (JP) .................................. 2020-102572

(51) Int. Cl.
*G01M 11/00*   (2006.01)
(52) U.S. Cl.
CPC .................................... *G01M 11/33* (2013.01)
(58) Field of Classification Search
CPC ................ G01M 11/33; G01M 11/088; H04B 10/07955; G01N 2203/0023
See application file for complete search history.

(56) References Cited

U.S. PATENT DOCUMENTS

| 4,636,070 A | 1/1987 | Ide |
| 4,714,343 A | 12/1987 | Ide |

(Continued)

FOREIGN PATENT DOCUMENTS

| EP | 3101826 A1 * 12/2016 | ........ G01M 11/3136 |
| JP | 861-128134 A   6/1986 | |

(Continued)

OTHER PUBLICATIONS

International Search Report dated Sep. 7, 2021 issued in PCT/JP2021/022195.
Written Opinion dated Sep. 7, 2021 issued in PCT/JP2021/022195.

Primary Examiner — Maurice C Smith
(74) Attorney, Agent, or Firm — McDonald Hopkins LLC

(57) ABSTRACT

A bending applying device includes three mandrels and applies bending to an optical fiber by winding the optical fiber onto the mandrels. The mandrels are alternately arranged at predetermined intervals such that outer circumferences of adjacent mandrels in a longitudinal direction of the optical fiber face each other in a non-contact manner. A diameter of the optical fiber is D, a radius of the mandrel is r, an interval between the adjacent mandrels in the first direction is 2r+d, a direction orthogonal to the first direction is a second direction, an interval between the adjacent mandrels in the second direction is s, and an angle θ between the second direction and a common internal tangent of the adjacent mandrels is 0 degrees or more and 45 degrees or less, and the formed angle θ satisfies following formula.

$$\sqrt{(d+D+4r)(d-D)+s^2} = 2\left(r+\frac{D}{2}\right)\tan\theta + \frac{s}{\cos\theta}$$

7 Claims, 11 Drawing Sheets

(56) References Cited

U.S. PATENT DOCUMENTS

| | | |
|---|---|---|
| 2003/0142948 A1 | 7/2003 | Lucas |
| 2008/0272221 A1 | 11/2008 | Emerson et al. |
| 2017/0074752 A1* | 3/2017 | Pitwon .................. G01M 11/33 |
| 2018/0006718 A1* | 1/2018 | Sawal ...................... G02B 6/14 |

FOREIGN PATENT DOCUMENTS

| | | |
|---|---|---|
| JP | 861-239137 A | 10/1986 |
| JP | H01-203938 A | 8/1989 |
| JP | 2012-018134 A | 1/2012 |

* cited by examiner

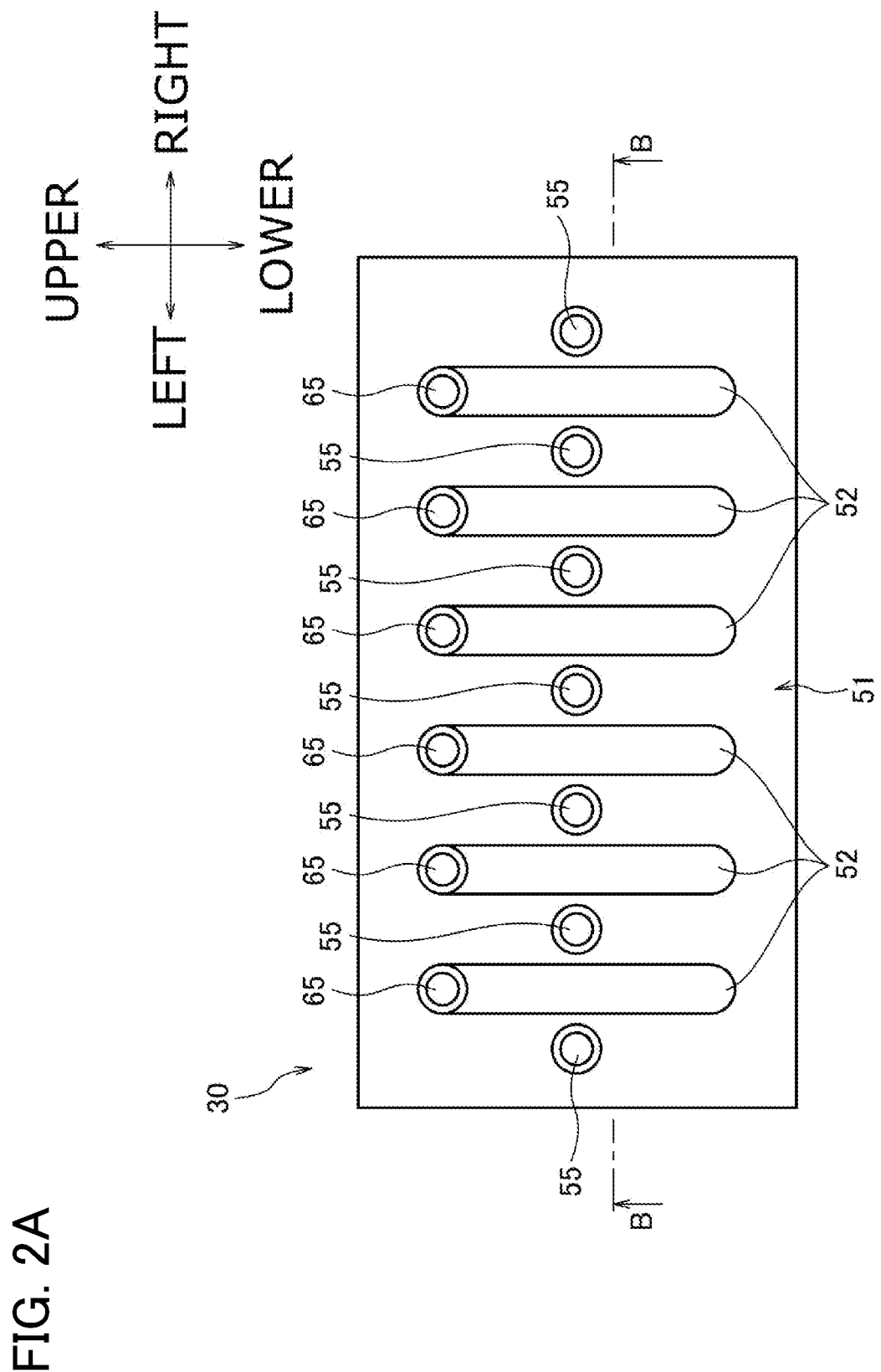

BENDING-IMPARTING DEVICE FOR MEASURING BENDING LOSS, AND BENDING TEST DEVICE

TECHNICAL FIELD

The present disclosure relates to a bending applying device for measuring a bending loss, and a bending test apparatus.

The present application claims priority from Japanese Patent Application No. 2020-102572 filed on Jun. 12, 2020, contents of which are incorporated by reference in its entirety.

BACKGROUND ART

Bending loss characteristic is one of the basic characteristics of an optical fiber. Recommendation G.652 of International Telecommunication Union-Telecommunication Standardization sector (ITU-T) describes characteristics of a general-purpose single mode fiber (SMF), and recommendation G.657 describes characteristics of a low bending loss single mode optical fiber.

A bending loss is calculated by attenuation of light caused by a bent optical fiber. For example, Patent Literature 1 discloses a structure in which a plurality of side surfaces having different curvatures are provided on one cylindrical body to obtain a bending loss.

CITATION LIST

Patent Literature

Patent Literature 1: JPH01-203938A

SUMMARY OF INVENTION

A bending applying device for measuring a bending loss according to an aspect of the present disclosure includes at least three mandrels and applies bending to a fed-out optical fiber by winding the optical fiber onto the mandrels, in which the mandrels are alternately arranged at predetermined intervals such that outer circumferences of adjacent mandrels in a longitudinal direction of the optical fiber face each other in a non-contact manner, a diameter of the optical fiber is D, a radius of the mandrel is set as r, in a plane orthogonal to rotation axes of the mandrels, a direction connecting an upstream-side contact point where the optical fiber starts to come into contact with a mandrel located at the center among the three mandrels having the same diameter continuously arranged along the longitudinal direction of the optical fiber and a downstream-side contact point where the optical fiber wound around the mandrel at the center starts to move away from the mandrel located at the center is a first direction, an interval between the adjacent mandrels in the first direction is $2r+d$, a direction orthogonal to the first direction in the plane orthogonal to the rotation axes of the mandrels is a second direction, an interval between the adjacent mandrels in the second direction is s, and an angle $\theta$ between the second direction and a common internal tangent of the adjacent mandrels as viewed from a center position of the optical fiber is 0 degrees or more and 45 degrees or less. Here, the formed angle $\theta$ satisfies the following Formula 3.

BRIEF DESCRIPTION OF DRAWINGS

FIG. 2A is a front view of a bending applying device of FIG. 1.

DESCRIPTION OF EMBODIMENTS

Technical Problem

Figure 1:
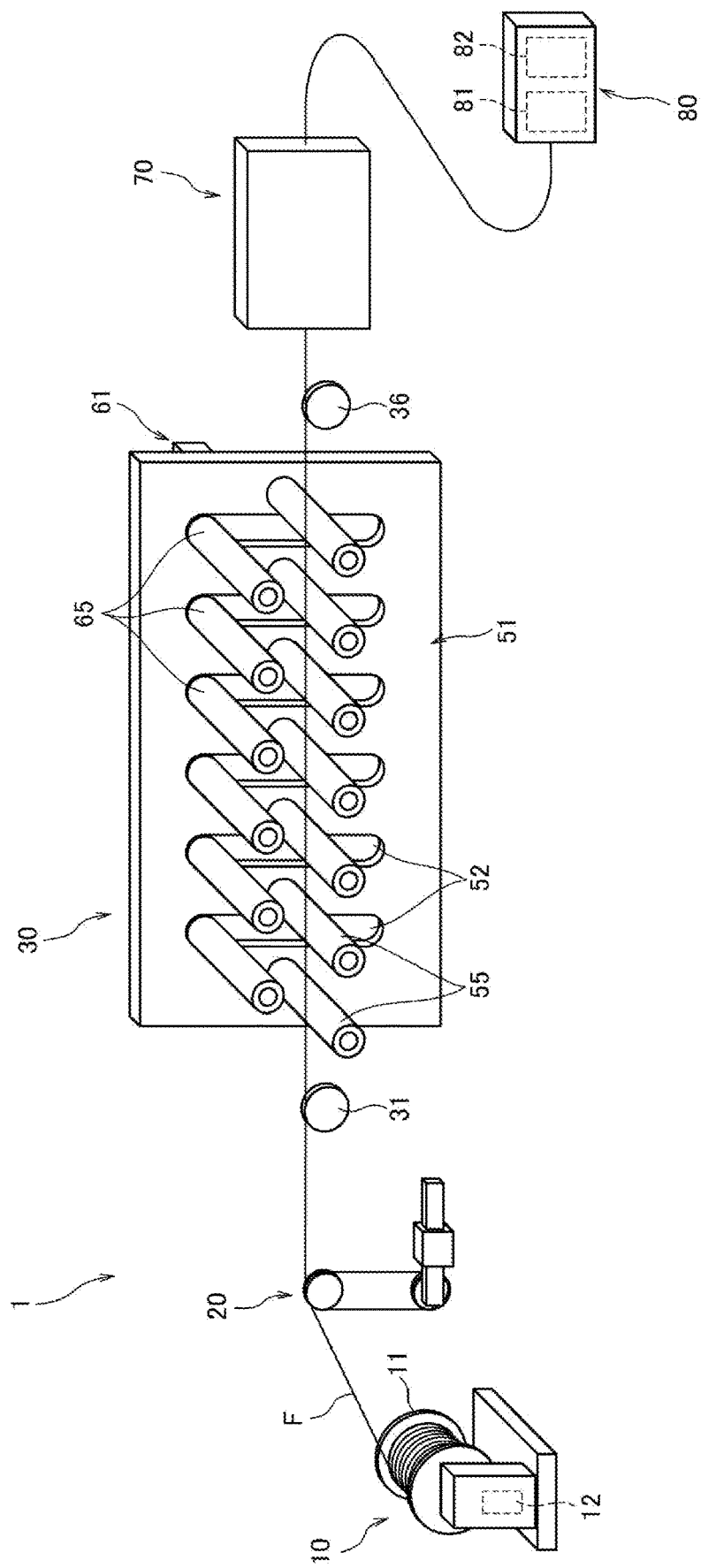
FIG. 1 is a schematic configuration diagram of a bending test apparatus according to an embodiment of the present disclosure.

In the structure described in Patent Literature 1, since the number of turns of the optical fiber is small, it is difficult to calculate the bending loss for the low bending loss single mode optical fiber.

On the other hand, in a case where the number of turns of the optical fiber is simply increased, efficiency is deteriorated, and since the optical fiber is spirally wound and a winding angle of the optical fiber tends to be small, an accurate bending loss may not be required.

Further, even in a case where an optical fiber having a small diameter (for example, about φ200 μm) is wound, the winding angle of the optical fiber tends to be small, and thus the bending loss may not be accurately calculated.

The present disclosure has been made in view of the above circumstances, and an object thereof is to provide a bending applying device for measuring a bending loss and a bending test apparatus by which a bending loss is efficiently and accurately calculated.

Effects of Present Disclosure

According to the above, the bending loss may be efficiently and accurately calculated.

DESCRIPTION OF EMBODIMENTS OF PRESENT DISCLOSURE

First, contents of embodiments of the present disclosure will be listed and described.

(1) A bending applying device for measuring a bending loss according to the present disclosure includes at least three mandrels and applies bending to a fed-out optical fiber by winding the optical fiber onto the mandrels, in which the mandrels are alternately arranged at predetermined intervals such that outer circumferences of adjacent mandrels in a longitudinal direction of the optical fiber face each other in a non-contact manner, a diameter of the optical fiber is D, a radius of the mandrel is set as r, in a plane orthogonal to rotation axes of the mandrels, a direction connecting an upstream-side contact point where the optical fiber starts to come into contact with a mandrel located at the center among the three mandrels having the same diameter continuously arranged along the longitudinal direction of the optical fiber and a downstream-side contact point where the optical fiber wound around the mandrel at the center starts to move away from the mandrel located at the center is a first direction, an interval between the adjacent mandrels in the first direction is 2r+d, a direction orthogonal to the first direction in the plane orthogonal to the rotation axes of the mandrels is a second direction, an interval between the adjacent mandrels in the second direction is s, and an angle θ between the second direction and a common internal tangent of the adjacent mandrels as viewed from a center position of the optical fiber is 0 degrees or more and 45 degrees or less. Here, the formed angle θ satisfies the following Formula 3.

By calculating the interval "2r+d" in the first direction and the interval "s" in the second direction when θ satisfies Equation 3, the arrangement of the mandrels may be determined. Therefore, even if the number of turns of the optical fiber is increased, a winding angle of the optical fiber with respect to the mandrels does not decrease, and the bending loss may be efficiently and accurately calculated.

(2) In an aspect of the bending applying device for measuring a bending loss according to the present disclosure, the bending applying device includes guides for providing a supply height of the optical fiber directed toward the mandrels and a discharge height of the optical fiber moving away from the mandrels, respectively.

A supply position and a discharge position of the optical fiber may be provided, which contributes to accurate measurement of the bending loss.

(3) In an aspect of the bending applying device for measuring a bending loss according to the present disclosure, the guides are disposed in parallel along a direction intersecting the longitudinal direction of the optical fiber.

Since bending may be applied to a plurality of optical fibers at the same time through use of the mandrels, efficiency of measuring the bending loss of the optical fibers is improved.

(4) In an aspect of the bending applying device for measuring a bending loss according to the present disclosure, the adjacent mandrels are a fixed mandrel that does not move, and a movable mandrel that is movable between a reference position where bending is not applied to the optical fiber and a forward position where the bending is applied to the optical fiber with the fixed mandrel, and among a plurality of the movable mandrels, a movable mandrel located at a downstream side in the longitudinal direction of the optical fiber is moved before a movable mandrel located at an upstream side to apply the bending to the optical fiber.

Since the bending is applied to the optical fiber from the downstream side to the upstream side, tension generated in the optical fiber may be leveled to eliminate a portion to which excessive tension is applied.

(5) A bending test apparatus according to the present disclosure includes any one of the above-described bending applying device for measuring a bending loss; and a tension applying mechanism configured to apply tension to the optical fiber directed toward the mandrel.

Loosening of the optical fiber in a case where the optical fiber is wound around the mandrel may be prevented.

(6) In an aspect of the bending test apparatus according to the present disclosure, the bending test apparatus includes at least an upstream-side bending applying device located at the upstream side in the longitudinal direction of the optical fiber and a downstream-side bending applying device located at the downstream side of the upstream-side bending applying device, and a diameter of a mandrel of the downstream-side bending applying device is formed to be larger than a diameter of a mandrel of the upstream-side bending applying device, and the mandrel of the downstream-side bending applying device is moved in the second direction before the mandrel of the upstream-side bending device to apply bending to the optical fiber.

Since the mandrels are configured to have two types of diameters and moved in order from the mandrel having a large diameter to apply bending, the bending loss with respect to the plurality of bending diameters may be measured, and the number of times of measurement of a reference is reduced. Accordingly, time required for measuring the bending loss of the optical fiber may be shortened.

(7) An aspect of the bending test apparatus according to the present disclosure includes a calculation unit configured to calculate a bending loss based on a length of the optical fiber to which the bending is applied.

The bending loss may be easily calculated by calculating a length of the optical fiber to which the bending is applied and converting the length by the number of turns of, for example, one turn or ten turns.

Details of Embodiments of Present Disclosure

Hereinafter, specific examples of a bending applying device for measuring a bending loss, and a bending test apparatus according to the present disclosure will be described with reference to the accompanying drawings. FIG. 1 is a schematic configuration diagram of a bending test apparatus 1 according to an aspect of the present disclosure.

As illustrated in FIG. 1, the bending test apparatus 1 includes a feeding portion 10, a dancer roller 20, a bending applying device 30, a fiber catcher 70, and a power meter 80. The dancer roller 20 corresponds to a tension applying mechanism of the present disclosure, and the bending applying device 30 corresponds to a bending applying device for measuring a bending loss of the present disclosure.

An optical fiber F is manufactured in advance, and is attached to the feeding portion 10 in a state of being wound around a bobbin 11. A light source 12 for inputting light to one end of the optical fiber F is installed in the feeding portion 10.

The optical fiber F fed out from the bobbin 11 of the feeding portion 10 is sent to the bending applying device 30 in a state in which tension is applied by the dancer roller 20, and is fixed to the fiber catcher 70.

In the bending applying device 30, bending may be applied to the optical fiber F through use of fixed mandrels 55 and movable mandrels 65, which will be described later.

The optical fiber F fixed to the fiber catcher 70 is connected to the power meter 80. The power meter 80 includes, for example, a light receiving unit 81 and a calculation unit 82. The light receiving unit 81 measures power of light output from the other end of the optical fiber F. The calculation unit 82 calculates a bending loss of the optical fiber F based on the power of the light measured by the light receiving unit 81 and a length of the optical fiber F to which the bending is applied by the bending applying device 30.

In addition to the fixed mandrels 55 and the movable mandrels 65, the bending applying device 30 includes a guide 31 between the bending applying device 30 and the dancer roller 20 and a guide 36 between the bending applying device 30 and the fiber catcher 70. The guide 31 provides a supply height of the optical fiber F directed toward the bending applying device 30, and the guide 36 provides a discharge height of the optical fiber F moving away from the bending applying device 30.

As illustrated in FIG. 2A, the bending applying device 30 includes, for example, a base plate 51 having a rectangular shape in a front view. The base plate 51 is provided with a plurality of (for example, five) through grooves 52 at equal intervals. Each of the through grooves 52 extends along a direction (an up-down direction illustrated in FIG. 2A) orthogonal to a longitudinal direction (a left-right direction illustrated in FIG. 2A) of the optical fiber F from the guide 31 toward the guide 36 illustrated in FIG. 1, and is formed to penetrate the base plate 51.

The base plate 51 is provided with the plurality of (for example, seven) fixed mandrels 55 at equal intervals. The fixed mandrel 55 is rotatably supported by a rotation shaft provided on the base plate 51 via a bearing, but the fixed mandrel 55 is fixed onto the base plate 51 and does not move in the up-down direction in the drawing. The fixed mandrels 55 are arranged one by one next to the through grooves 52 along the longitudinal direction of the optical fiber F. A diameter (2r) of the fixed mandrel 55 is selected from, for example, 10 mm, 15 mm, 20 mm, 30 mm, and 60 mm.

Figure 2B:
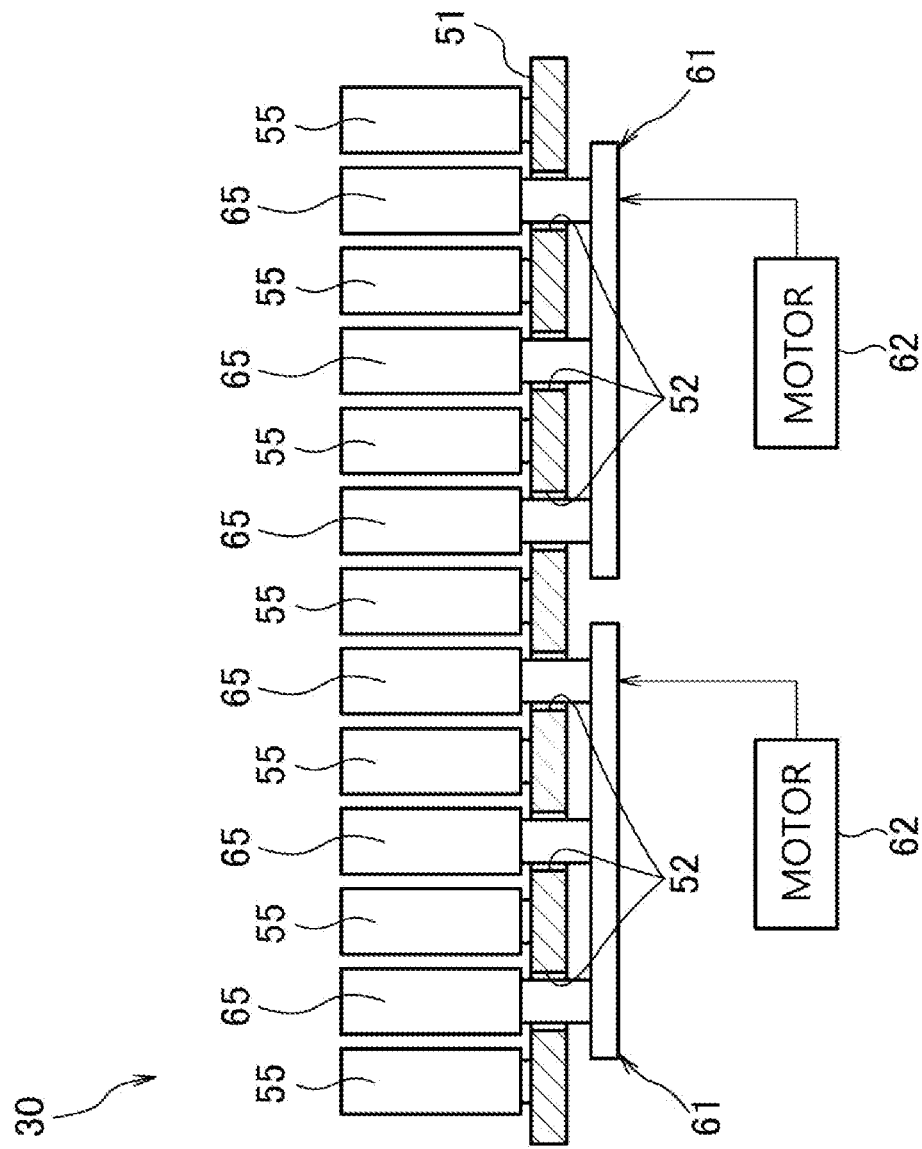
FIG. 2B is a cross-sectional view taken along a line B-B of FIG. 2A.

As illustrated in FIG. 2B, the bending applying device 30 includes slide plates 61 on, for example, a back side of the base plate 51. The slide plate 61 is provided with the plurality of (for example, six) movable mandrels 65 at equal intervals. In FIG. 2B, an example of a total of two slide plates 61 on each of which three movable mandrels 65 are mounted is described, but for example, one slide plate 61 on which six movable mandrels 65 are mounted may be implemented.

Each of the movable mandrels 65 is rotatably supported by a rotation shaft provided on the slide plate 61 via a bearing. Each rotation shaft is disposed in the through groove 52, and each movable mandrel 65 is disposed next to the fixed mandrel 55. A diameter (2r) of the movable mandrel 65 is set to be the same as the diameter of the adjacent fixed mandrel 55, and for example, any one of 10 mm, 15 mm, 20 mm, 30 mm, and 60 mm is selected.

It is preferable that both the fixed mandrel 55 and the movable mandrel 65 are rotatably supported, but the fixed mandrel 55 and the movable mandrel 65 may not rotate as long as a mandrel surface is smooth and slippery.

The slide plate 61 is movable in the up-down direction illustrated in FIG. 2A by a motor 62.

Figure 2C:
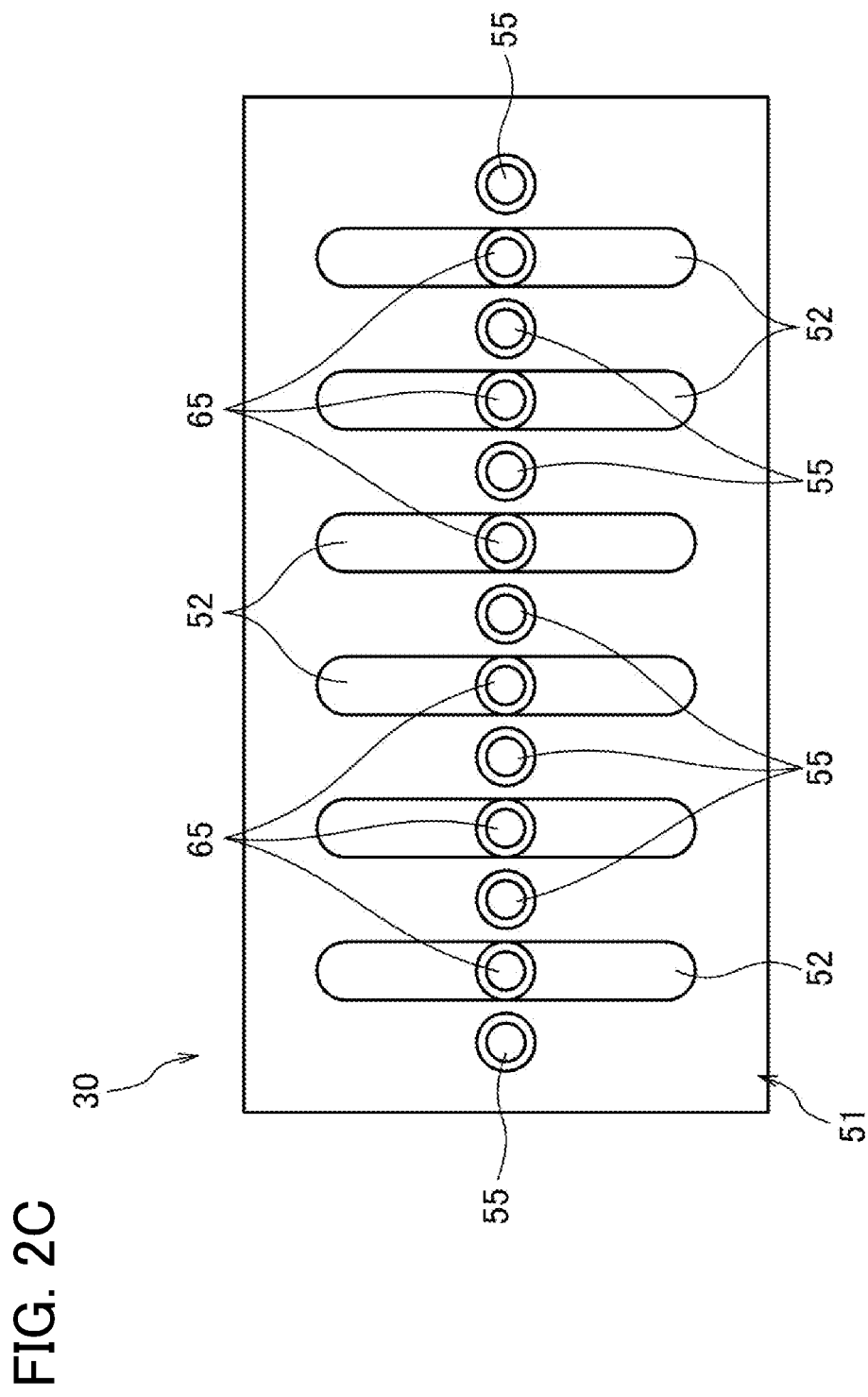
FIG. 2C is a diagram illustrating an operation of the bending applying device of FIG. 1.

In a case where the movable mandrel 65 is located at one end (corresponding to a reference position where bending is not applied to the optical fiber of the present disclosure) of the through groove 52 as illustrated in FIG. 2A and the optical fiber F is fed out from the guide 31 toward the guide 36, when the motor 62 is driven, each movable mandrel 65 moves downward along the through groove 52 as illustrated in FIG. 2C. In the case of FIG. 2C, an outer periphery of the fixed mandrel 55 and an outer periphery of the movable mandrel 65 adjacent to each other are arranged at a predetermined interval so as to face each other in a non-contact manner. The optical fiber F is wound around the outer periphery of the movable mandrel 65 and bent upward, and is wound around the outer periphery of the fixed mandrel 55 on the right side of the movable mandrel 65 and bent downward.

Figure 2D:
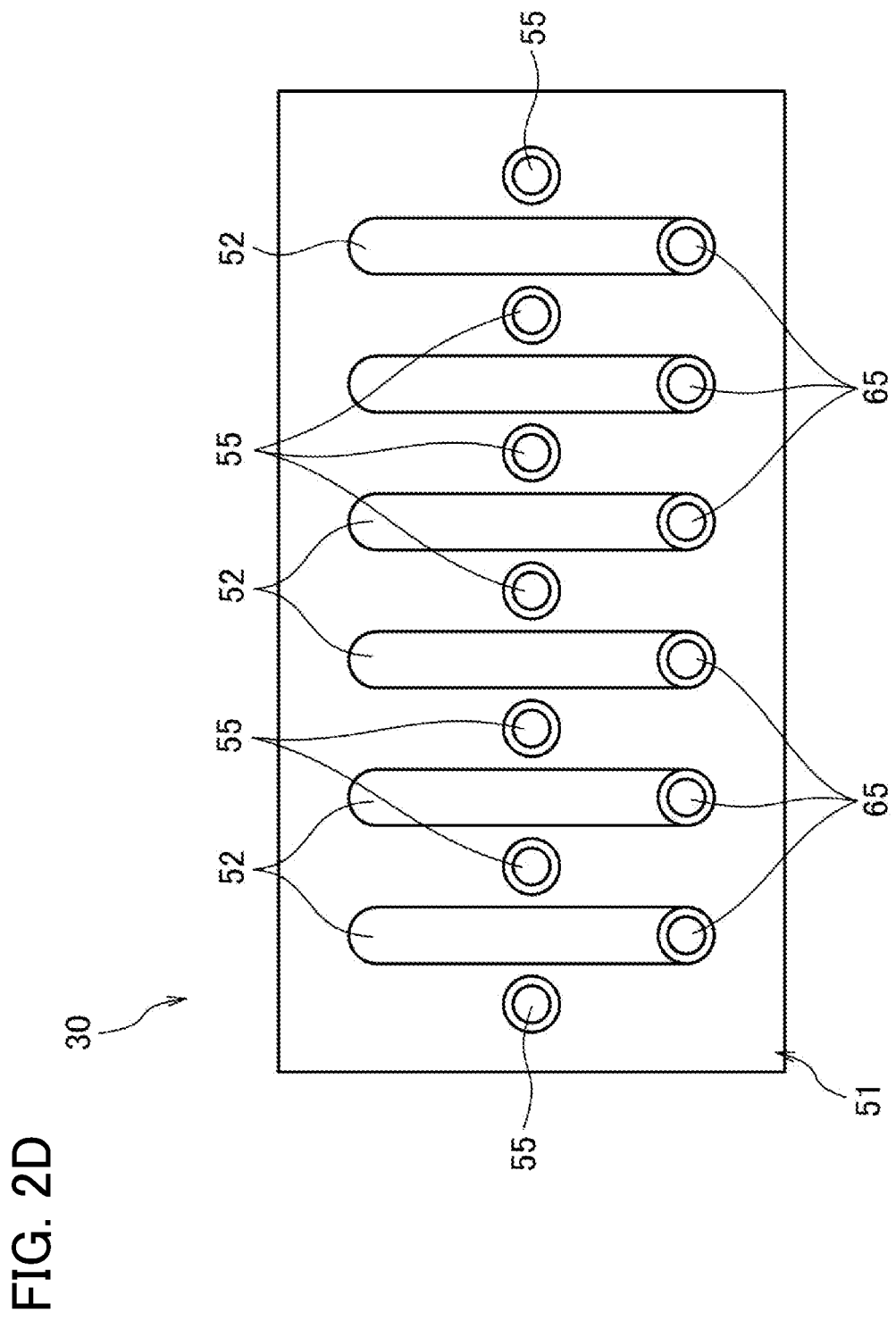
FIG. 2D is a diagram illustrating an operation of the bending applying device of FIG. 1.

Thereafter, as illustrated in FIG. 2D, when the movable mandrels 65 are moved to, for example, the other ends of the through grooves 52 (corresponding to forward positions where bending is applied to the optical fiber of the present disclosure), the adjacent fixed mandrels 55 and movable mandrels 65 are arranged at a predetermined interval such that the outer peripheries thereof face each other in a non-contact manner, and are alternately arranged in the left-right direction with the fixed mandrels 55 on an upper side and the movable mandrels 65 on a lower side. In this case, the optical fiber F is wound around each outer periphery of the movable mandrel 65 and bent upward at an angle close to 180 degrees, for example, but not exceeding 180 degrees, and is also bent downward by the fixed mandrels 55 on the right side of the movable mandrels 65 at an angle close to 180 degrees. Accordingly, the optical fiber F is bent by being sandwiched between the adjacent fixed mandrels 55 and movable mandrels 65.

In this way, since the movable mandrels 65 are moved to the forward positions, and the bending loss is applied to the optical fiber F by sandwiching the optical fiber F between the movable mandrels 65 and the fixed mandrels 55, it is not necessary for an operator to hook the optical fiber to the mandrels, and the operation is not troublesome.

Here, when the movable mandrels 65 are moved to the forward positions illustrated in FIG. 2D, a predetermined relational expression is established by the fixed mandrels 55 and the movable mandrels 65 around which the optical fiber F is wound.

Figure 3:
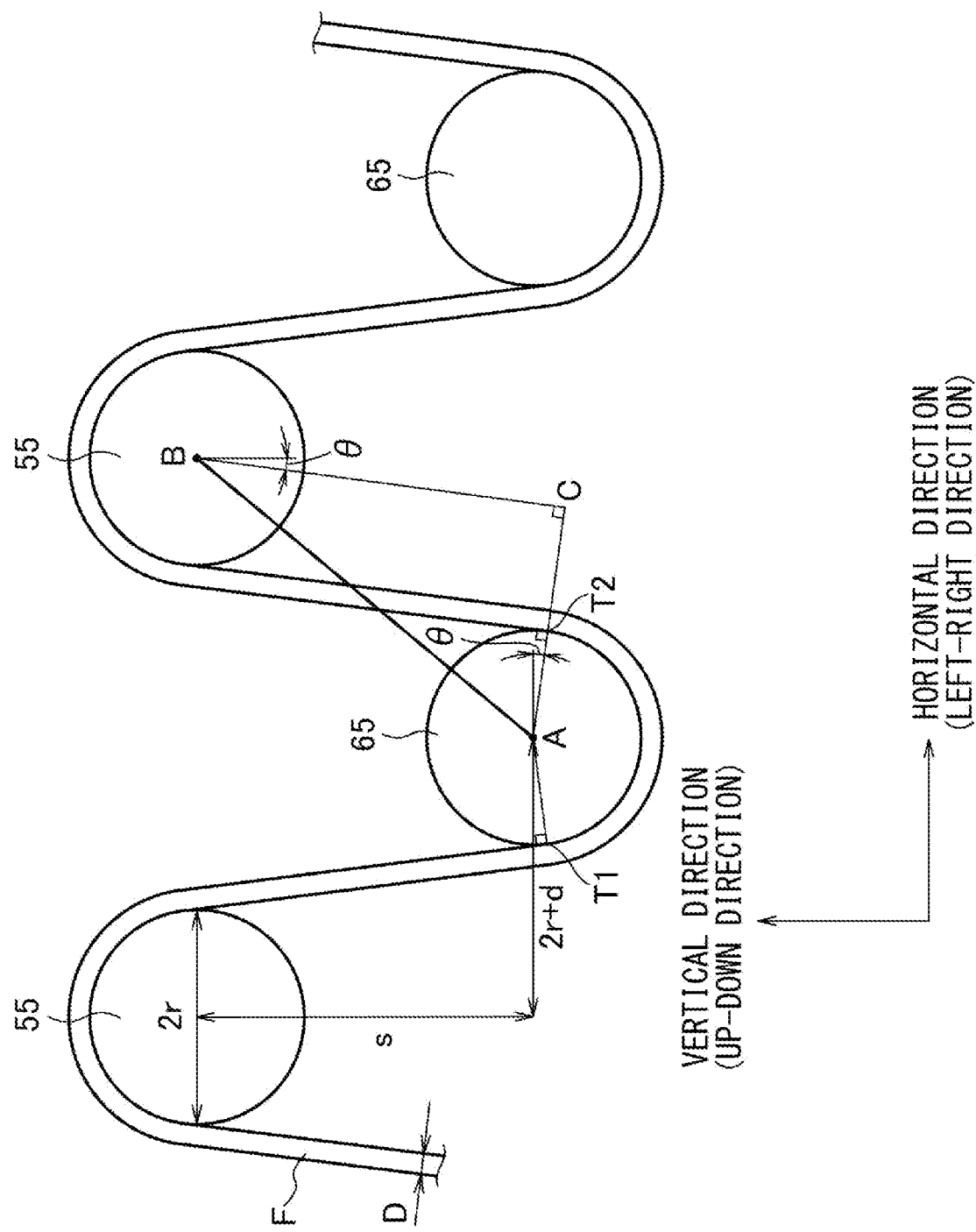
FIG. 3 is a diagram illustrating a calculation model in which mandrels are disposed.

Specifically, as illustrated in FIG. 3 in which the forward positions illustrated in FIG. 2D are enlarged, attention is paid to the movable mandrel 65 at a center position among the fixed mandrel 55, the movable mandrel 65, and the fixed mandrel 55 that are continuously arranged. The optical fiber F approaches a lower side from the left adjacent fixed mandrel 55, starts to come into contact with the movable mandrel 65 at a contact point T1 on an upstream side, and then is wound around the outer periphery of the movable mandrel 65. Then, at a contact point T2 on a downstream side, the optical fiber F starts to move away from the movable mandrel 65, and approaches the right adjacent fixed mandrel 55 toward an upper side.

In this specification, a feeding side of the optical fiber is referred to as the upstream side, and a side on which the optical fiber is fixed by the fiber catcher is referred to as the downstream side.

In a case where a radius of the fixed mandrel 55 and a radius of the movable mandrel 65 are both equal to r, a distance between axial centers in a horizontal direction of the adjacent mandrels illustrated in FIG. 3 may be indicated by 2r+d. The horizontal direction is the same direction as the left-right direction in FIG. 2A, and corresponds to a first direction connecting an upstream-side contact point T1 where the optical fiber starts to come into contact with the mandrel located at the center and a downstream-side contact point T2 where the optical fiber starts to move away from the mandrel located at the center in a plane orthogonal to a rotation axis of the mandrel of the present disclosure (a plane having the rotation axis of the mandrel as a normal line).

Further, a distance between the axial centers in a vertical direction of the adjacent mandrels illustrated in FIG. 3 may be indicated by s. The vertical direction is the same direction as the up-down direction in FIG. 2A, and corresponds to a second direction orthogonal to the first direction in a plane orthogonal to the rotation axis of the mandrel of the present disclosure.

A distance between adjacent surfaces of the fixed mandrel 55 and the movable mandrel 65 in the first direction is d. In a case where a diameter of the optical fiber F is D (D≤d), a distance of a common internal tangent between the fixed mandrel 55 and the movable mandrel 65 as viewed from a center position of the optical fiber F is a length of a straight line BC of a right triangle ABC illustrated in FIG. 3. In $BC^2=AB^2-AC^2$, $AB^2$ is $(2r+d)^2+s^2$, $AC^2$ is $(2r+D)^2$, and a length of the straight line BC may be represented by Formula 1.

$$\sqrt{(d+D+4r)(d-D)+s^2}$$ [Formula 1]

On the other hand, in a case where an angle formed by the vertical direction of the adjacent mandrels illustrated in FIG. 3 and the common internal tangent between the fixed mandrel 55 and the movable mandrel 65 as viewed from the center position of the optical fiber F is θ (0°≤θ<90°), the length of the straight line BC is the sum of AC*tan θ and s/cos θ, and thus may be represented by Formula 2.

$$2\left(r+\frac{D}{2}\right)\tan\theta + \frac{s}{\cos\theta}$$ [Formula 2]

Formula 3 may be calculated by Formulae 1 and 2.

$$\sqrt{(d+D+4r)(d-D)+s^2} = 2\left(r+\frac{D}{2}\right)\tan\theta + \frac{s}{\cos\theta}$$ [Formula 3]

In this way, by calculating the inter-axial center distance 2r+d in the horizontal direction and the inter-axial center distance s in the vertical direction between the adjacent mandrels illustrated in FIG. 3 in a case where θ satisfies Formula 3, the arrangement of the fixed mandrel 55 and the movable mandrel 65 may be determined. Therefore, even if the number of turns of the optical fiber F is increased, a winding angle of the optical fiber F with respect to the fixed mandrel 55 or the movable mandrel 65 does not become small, and the bending loss may be efficiently and accurately calculated.

The winding angle of the optical fiber F with respect to the movable mandrel 65 is represented by 180°−2θ. When θ is 0 degrees, the winding angle of the optical fiber F is 180 degrees, and an ideal winding state is obtained. When the bending applying device 30 is used, the arrangement of the fixed mandrel 55 and the movable mandrel 65 may be determined such that the ratio of a difference between the winding length in an ideal winding state and an actual winding length to the winding length in the ideal winding state satisfies, for example, 50% or less (2θ/180°≤0.5), and preferably 10% or less (2θ/180°≤0.1), and more preferably 2% or less (2θ/180°≤0.02). That is, the fixed mandrel 55 and the movable mandrel 65 are arranged such that θ is 0° or more and 45° or less, preferably 0° or more and 9° or less, and more preferably 0° or more and 1.8° or less.

By setting θ in the above range, it is possible to provide the length of the optical fiber F to which bending is applied without excessively increasing the number of the fixed mandrels 55 and the movable mandrels 65.

The length of the optical fiber F to which the bending is applied by the bending applying device 30 may be calculated from the winding angle of each of the fixed mandrel 55 and the movable mandrel 65 of the bending applying device 30. That is, θ is calculated using Formula 3, and for the mandrels at both ends of the bending applying device 30, the length of the optical fiber F to which bending is applied by the mandrels is rπ(90°−θ)/180, and for the mandrel other than those at both ends, the length of the optical fiber F to which bending is applied by the mandrels is rπ(180°−2θ)/180°, and thus by combining these, the length of the optical fiber F, to which bending is applied by the bending applying device 30, may be calculated.

Example 1

FIGS. 4 to 7 are diagrams illustrating an example of an optical fiber bending loss measuring method. In this Example, an upstream-side bending applying device 30a is provided in the vicinity of the feeding portion 10 described with reference to FIG. 1, a downstream-side bending applying device 30c is provided in the vicinity of the fiber catcher 70, and a midstream-side bending applying device 30b is provided between the upstream-side bending applying device 30a and the downstream-side bending applying device 30c.

The upstream-side bending applying device 30a includes guides 31, 32, and fixed mandrels 53 and movable mandrels 63 each having a diameter (2r) of, for example, 15 mm between the guide 31 and the guide 32. The midstream-side bending applying device 30b includes guides 33, 34, and fixed mandrels 54 and movable mandrels 64 each having a diameter (2r) of, for example, 20 mm between the guide 33 and the guide 34. The downstream-side bending applying device 30c includes guides 35, 36, and fixed mandrels 55 and movable mandrels 65 each having a diameter (2r) of, for example, 30 mm between the guide 35 and the guide 36.

Figure 4:
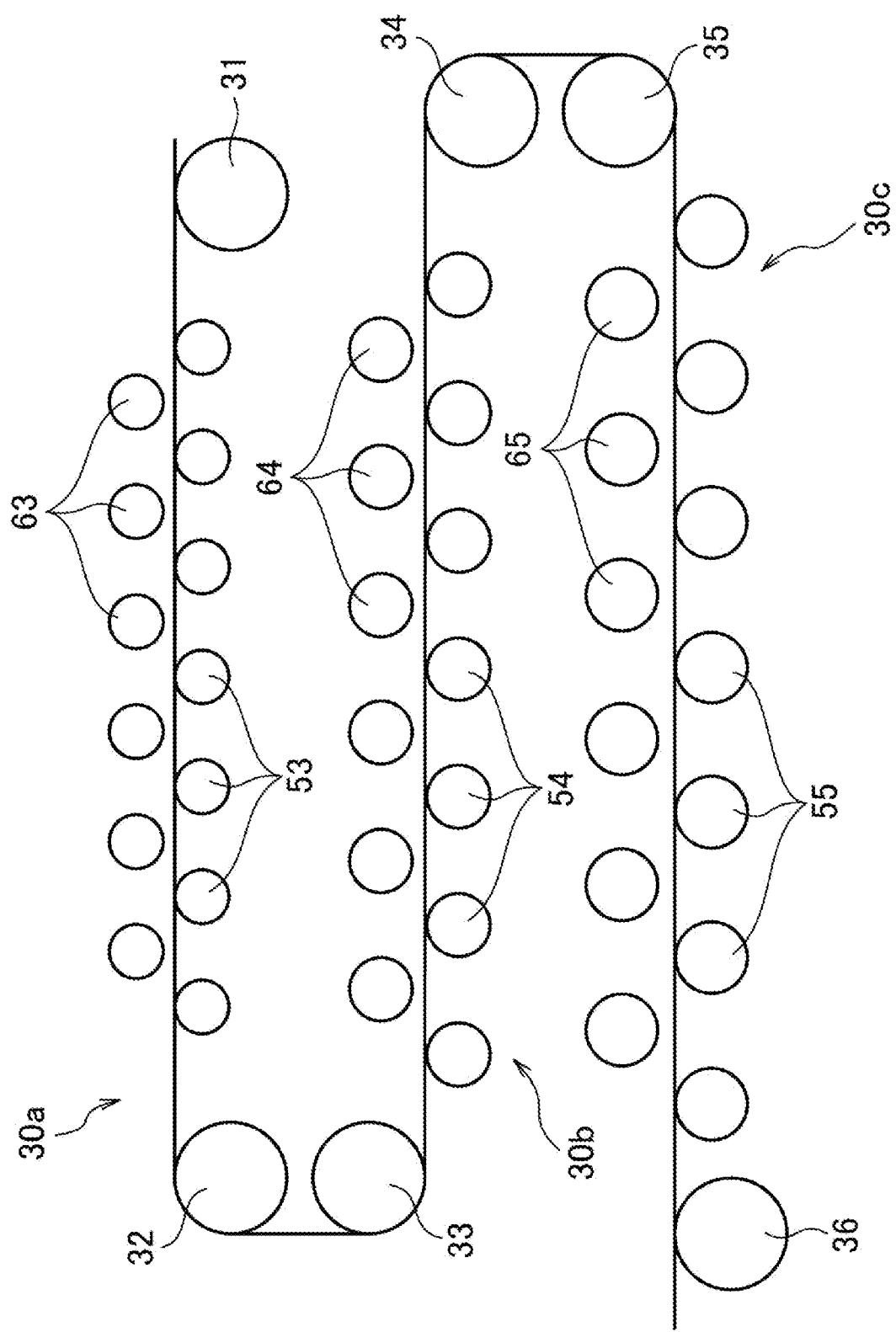
FIG. 4 is a diagram illustrating a state in which bending is not applied to an optical fiber.

First, the optical fiber F fed out from the feeding portion 10 is fed out from the guide 31 toward the guide 36 in a state in which tension is applied by the dancer roller 20, and is fixed to the fiber catcher 70 (a fiber fixing step). In this case, as illustrated in FIG. 4, each of the movable mandrels 63, 64, and 65 is disposed at the reference position, and the optical fiber F is passed between the mandrels and fixed to the fiber catcher 70 without being sandwiched between the adjacent mandrels. One end of the optical fiber F is connected to the power meter 80.

Next, for example, the bending loss of the optical fiber F is calculated by the power meter 80 in a state in which each of the movable mandrels 63, 64, 65 is at the reference position and not moved, that is, in a state in which the optical fiber F is not bent (a reference measurement step).

Figure 5:
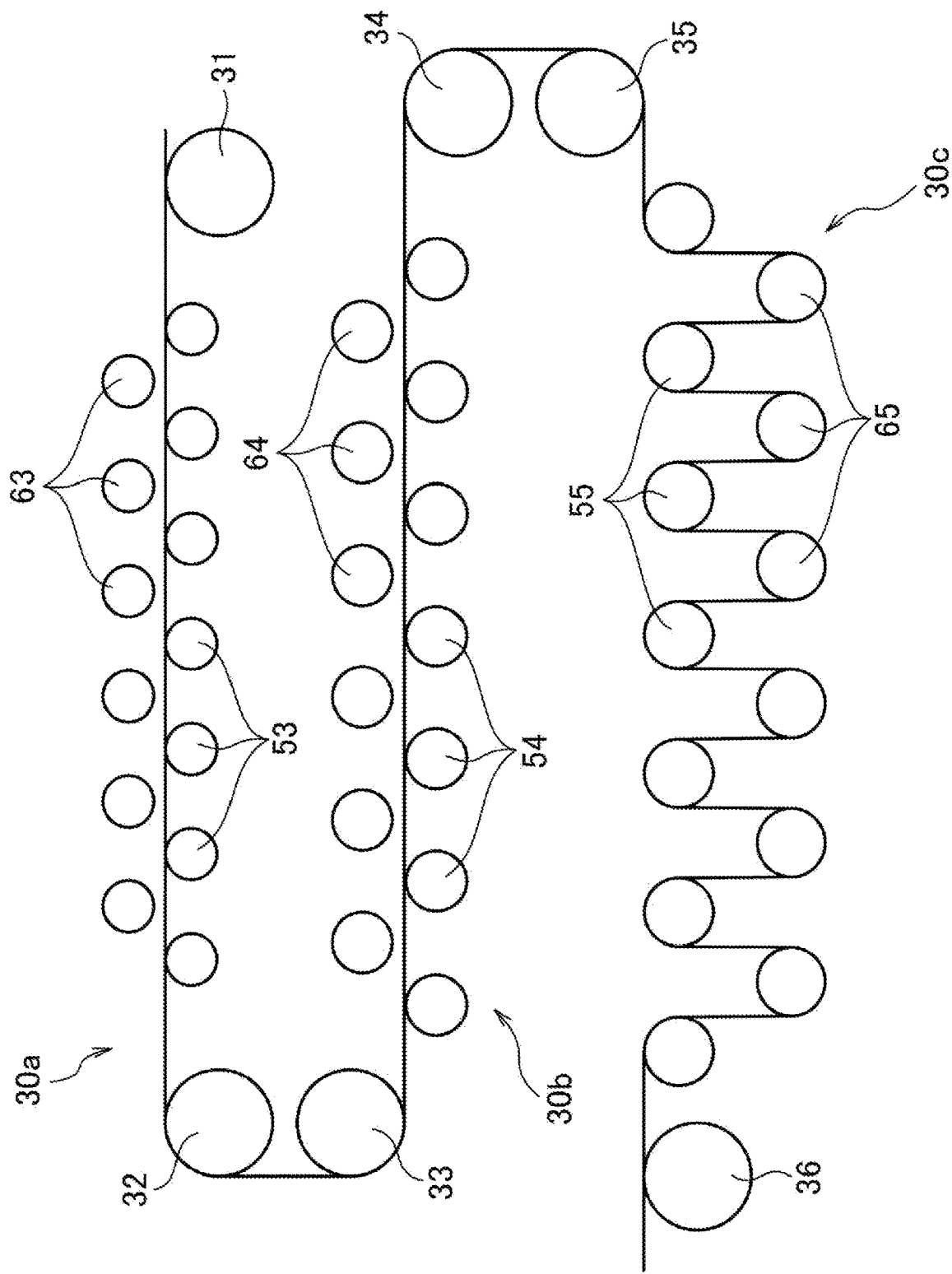
FIG. 5 is a view illustrating a state in which a part of movable mandrels are moved to apply the bending to the optical fiber.

Subsequently, as illustrated in FIG. 5, the large-diameter movable mandrels 65 are moved to the forward positions by the downstream-side bending applying device 30c. Accordingly, the optical fiber F is bent upward at a predetermined angle (for example, 180 degrees) by the movable mandrels 65, is bent downward at a predetermined angle (for example, 180 degrees) by the adjacent fixed mandrels 55, so that bending is applied to the optical fiber F by sandwiching the optical fiber F between the adjacent movable mandrels 65 and the fixed mandrels 55. Then, the bending loss of the optical fiber F is calculated by the power meter 80 in a state in which bending is applied to the optical fiber F by the large-diameter fixed mandrels 55 and movable mandrels 65 (a large-diameter bending loss measurement step).

Figure 6:
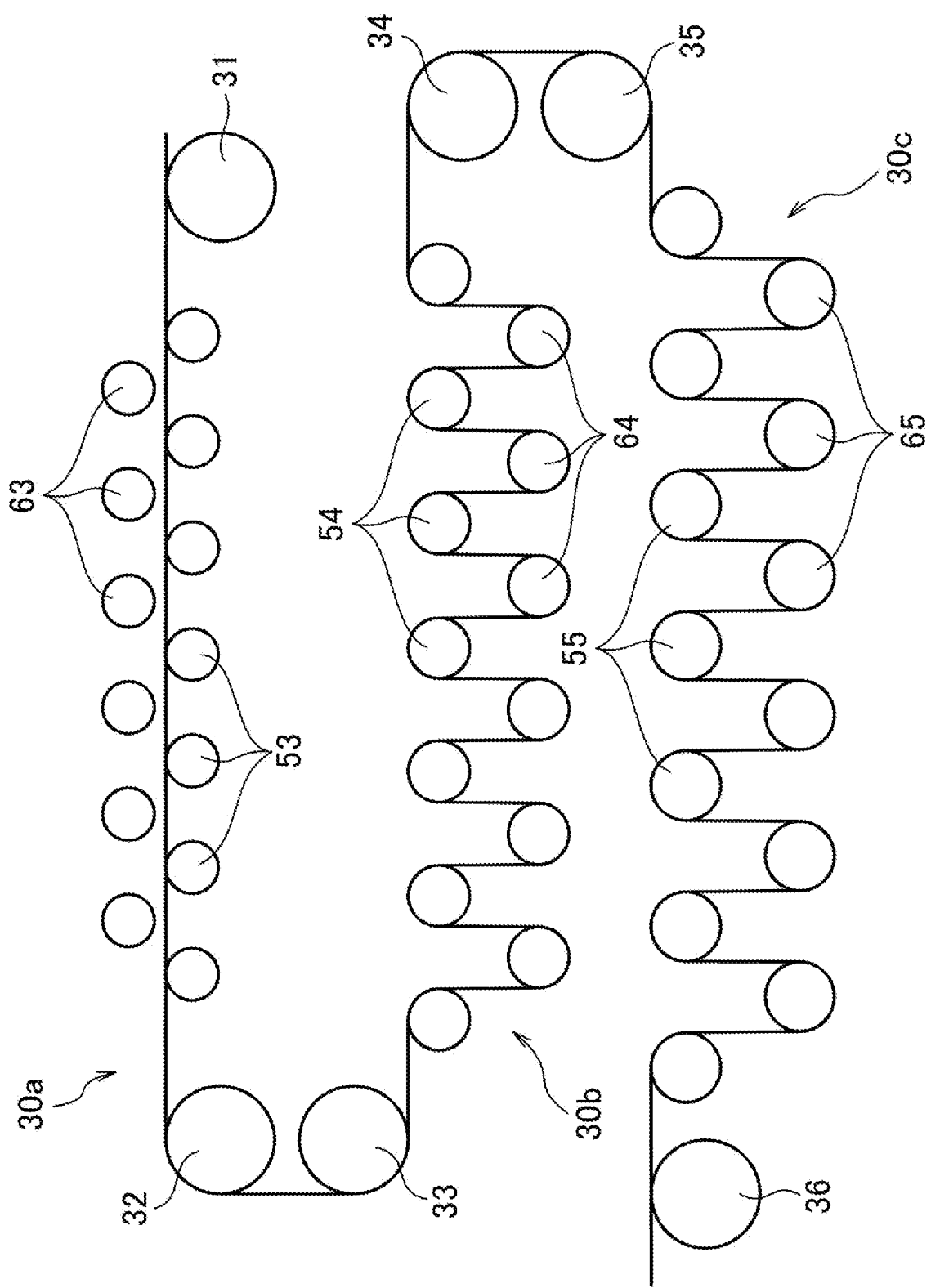
FIG. 6 is a view illustrating a state in which a part of the movable mandrels are moved to apply the bending to the optical fiber.

Next, as illustrated in FIG. 6, the medium-diameter movable mandrels 64 are also moved to the forward positions by the medium-side bending applying device 30b. Accordingly, bending is applied to the optical fiber F by sandwiching the optical fiber F between the adjacent movable mandrel 64 and the fixed mandrel 54 (a midstream-side bending applying step). Then, the bending loss of the optical fiber F is calculated by the power meter 80 in a state in which bending is applied to the optical fiber F by the medium-diameter fixed mandrels 54 and movable mandrels 64 in addition to the large-diameter fixed mandrels 55 and movable mandrels 65. In this case, the bending loss in a case where the bending is applied by the medium-diameter fixed mandrels 54 and movable mandrels 64 may be calculated (a medium-diameter bending loss measurement step).

Figure 7:
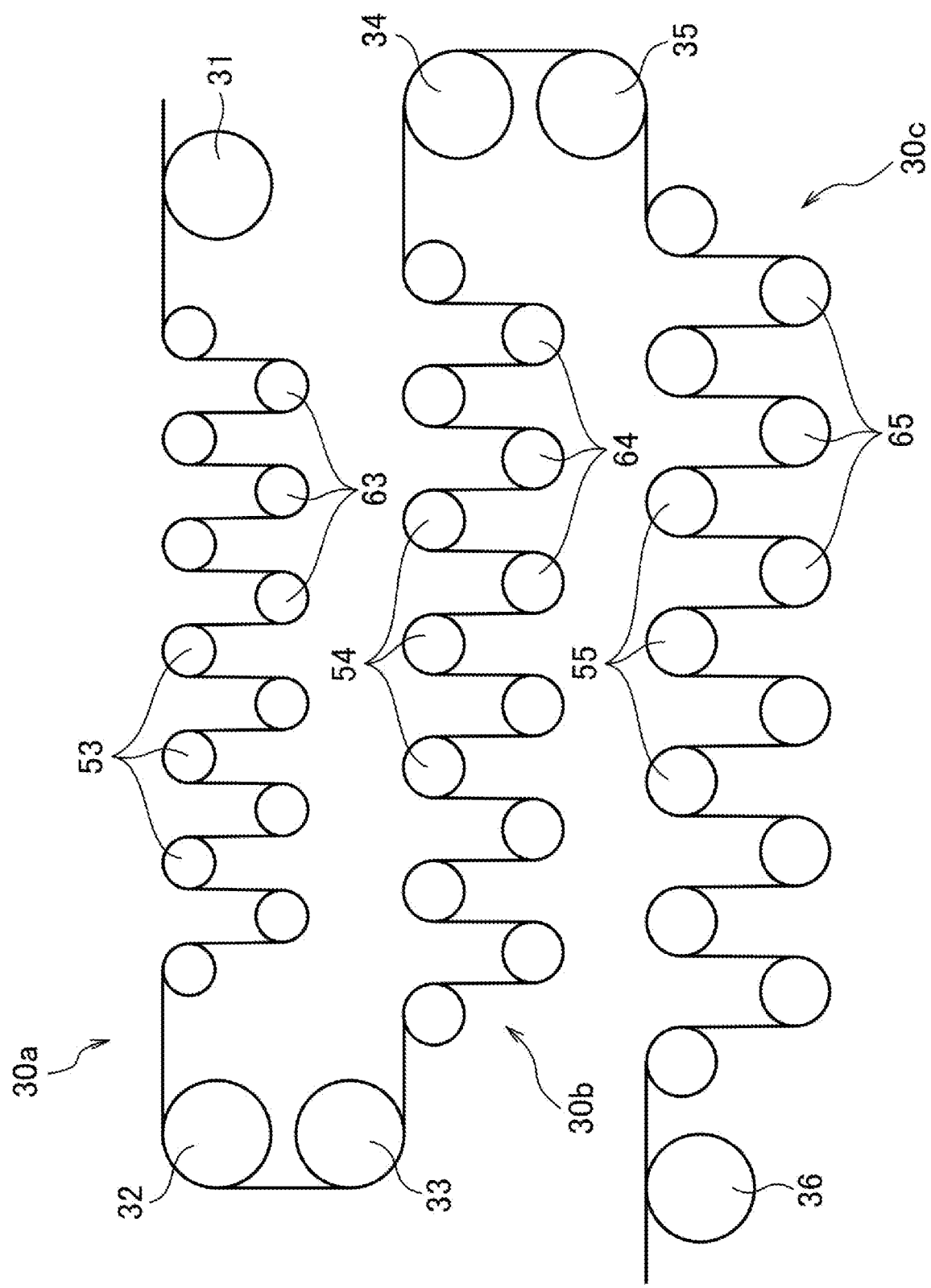
FIG. 7 is a view illustrating a state in which all the movable mandrels are moved to apply the bending to the optical fiber.

Thereafter, as illustrated in FIG. 7, the small-diameter movable mandrels 63 are also moved to the forward positions by the upstream-side bending applying device 30a, and the bending loss of the optical fiber F is calculated by the power meter 80 in a state in which the optical fiber F is bent by all of the large-diameter fixed mandrels 55 and movable mandrels 65, the medium-diameter fixed mandrels 54 and movable mandrels 64, the small-diameter fixed mandrels 53 and movable mandrels 63. In this case, the bending loss in a case where the bending is applied by the medium-diameter fixed mandrels 53 and movable mandrels 63 may be calculated (a small-diameter bending loss measurement step).

In this way, since bending is applied to the optical fiber F from the downstream side to the upstream side, the tension generated in the optical fiber F may be leveled to eliminate a portion to which excessive tension is applied.

Further, since the mandrels are configured to have three types of diameters, and the large-diameter movable mandrels 65, the medium-diameter movable mandrels 64, and the small-diameter movable mandrels 63 are moved in this order to apply bending, the bending loss with respect to the plurality of bending diameters may be measured, and the number of times of measurement as the reference is reduced. Accordingly, time required for measuring the bending loss of the optical fiber F may be shortened.

In Example 1, the reference measurement step and the bending loss measurement step were performed in this order. However, the bending loss measurement step and the reference measurement step may be performed in this order, and the reference measurement step may be performed after the bending is applied.

Further, although an example of the mandrel with the bearing has been described, in a case where the movable mandrel 65 is sequentially moved from a fiber catcher 70 side toward a feeding portion 10 side, the present invention may also be applied to a mandrel without the bearing.

Example 2

In FIG. 1, an example in which one optical fiber F is fed out from one feeding portion 10 to one bending applying device 30 has been described. However, as described above, in a case where mandrels are used instead of rollers in the bending applying device 30, a plurality of feeding portions may be arranged in parallel along the direction intersecting the longitudinal direction of the optical fiber F.

Figure 8:
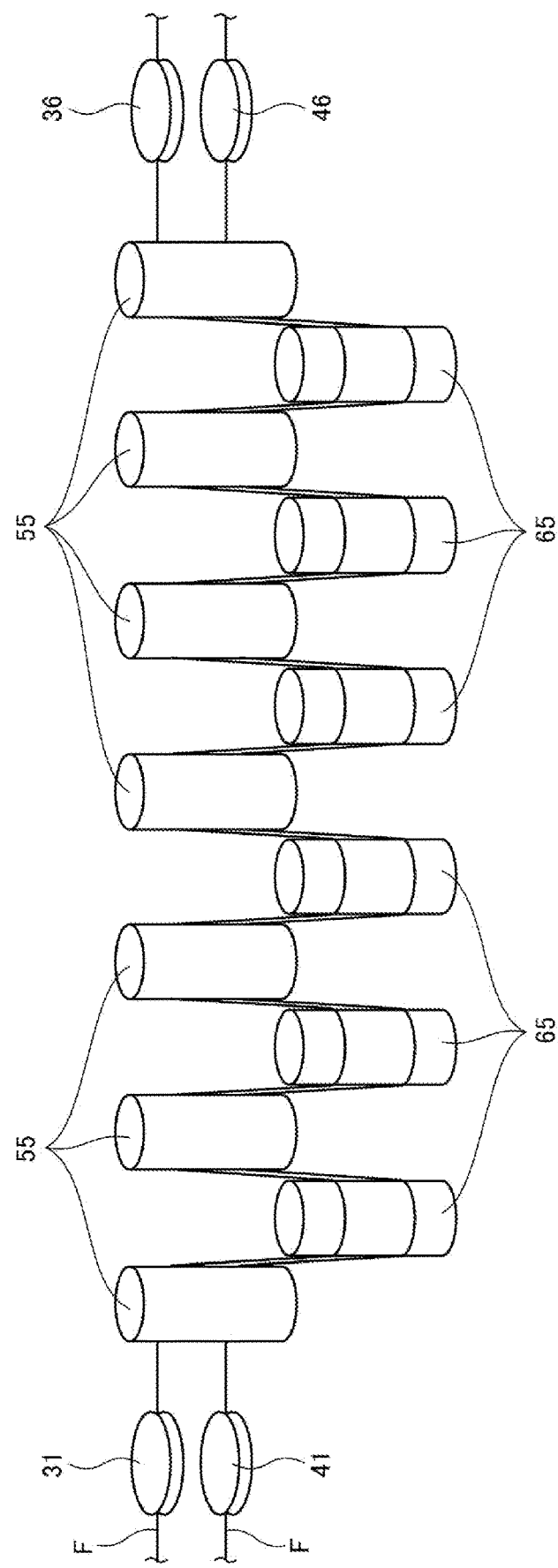
FIG. 8 is a diagram illustrating an example in which a plurality of guides are arranged in parallel.

Specifically, as illustrated in FIG. 8, in a case where a guide 41 is disposed in parallel with a guide 31 and a guide 46 is disposed in parallel with a guide 36, the optical fiber F traveling from the guide 41 to the guide 46 as well as the optical fiber F traveling from the guide 31 to the guide 36 may be bent through use of the fixed mandrels 55 and the movable mandrels 65. Therefore, efficiency of measuring the bending loss of the optical fiber F is improved.

It should be understood that the embodiment disclosed herein is illustrative in all respects and not restrictive. The scope of the present disclosure is defined by the claims, rather than the meaning described above, and is intended to include any modifications within the scope and meaning equivalent to the claims.

REFERENCE SIGNS LIST 1 bending test apparatus
10 feeding portion
11 bobbin
12 light source
20 dancer roller (tension applying mechanism)
30, 30a, 30b, 30c bending applying device (bending applying device for measuring bending loss)
31, 32, 33, 34, 35, 36, 41, 46 guide
51 base plate
52 through groove
53, 54, 55 fixed mandrel
61 slide plate
62 motor
63, 64, 65 movable mandrel
70 fiber catcher
80 power meter
81 light receiving unit
82 calculation unit
F optical fiber

What is claimed is:

1. A bending applying device for measuring a bending loss including at least three mandrels and applying bending to a fed-out optical fiber by winding the optical fiber onto the mandrels,
   wherein the mandrels are alternately arranged at predetermined intervals such that outer circumferences of adjacent mandrels in a longitudinal direction of the optical fiber face each other in a non-contact manner,
   a diameter of the optical fiber is D,
   a radius of the mandrel is r,
   in a plane orthogonal to rotation axes of the mandrels, a direction connecting an upstream-side contact point and a downstream-side contact point is a first direction, the upstream-side contact point being a point where the optical fiber starts to come into contact with a mandrel located at the center among the three mandrels having the same diameter and continuously arranged along the longitudinal direction of the optical fiber, the downstream-side contact point being a point where the optical fiber wound around the mandrel at the center starts to move away from the mandrel located at the center,
   a distance between surfaces of the adjacent mandrels in the first direction is d,
   an interval between the adjacent mandrels in the first direction is 2r+d,
   a direction orthogonal to the first direction in the plane orthogonal to the rotation axes of the mandrels is a second direction,
   an interval between the adjacent mandrels in the second direction is s, and
   an angle θ between the second direction and a common internal tangent of the adjacent mandrels as viewed from a center position of the optical fiber is 0 degrees or more and 45 degrees or less, and
   the formed angle θ satisfies following formula $$\sqrt{(d+D+4r)(d-D)+s^2} = 2\left(r+\frac{D}{2}\right)\tan\theta + \frac{s}{\cos\theta}.$$

2. The bending applying device according to claim 1 further comprising guides for providing a supply height of the optical fiber directed toward the mandrels and a discharge height of the optical fiber moving away from the mandrels, respectively.

3. The bending applying device according to claim 2,
wherein the guides are disposed in parallel along a direction intersecting the longitudinal direction of the optical fiber.

4. The bending applying device according to claim 1,
wherein the adjacent mandrels are a fixed mandrel that is configured not to move, and a movable mandrel that is movable between a reference position where bending is not applied to the optical fiber and a forward position where the bending is applied to the optical fiber, and
wherein among a plurality of the movable mandrels, a movable mandrel located at a downstream side in the longitudinal direction of the optical fiber is moved before a movable mandrel located at an upstream side to apply the bending to the optical fiber is moved.

5. A bending test apparatus comprising:
the bending applying device for measuring a bending loss according to claim 1; and
a tension applying mechanism configured to apply tension to the optical fiber directed toward the mandrel.

6. The bending test apparatus according to claim 5,
wherein the bending test apparatus includes at least an upstream-side bending applying device located at the upstream side in the longitudinal direction of the optical fiber and a downstream-side bending applying device located at the downstream side of the upstream-side bending applying device, and a diameter of a mandrel of the downstream-side bending applying device is formed to be larger than a diameter of a mandrel of the upstream-side bending applying device, and
wherein the mandrel of the downstream-side bending applying device is moved in the second direction before the mandrel of the upstream-side bending device to apply bending to the optical fiber is moved.

7. The bending test apparatus according to claim 5 further comprising:
a power meter configured to obtain a bending loss based on a length of the optical fiber to which the bending is applied.

* * * * *